US011449906B1

(12) United States Patent
Zeng et al.

(10) Patent No.: US 11,449,906 B1
(45) Date of Patent: Sep. 20, 2022

(54) DYNAMIC AUGMENTING RELEVANCE RANKINGS USING DATA FROM EXTERNAL RATINGS SOURCES

(71) Applicant: Groupon, Inc., Chicago, IL (US)

(72) Inventors: Guokai Zeng, Sunnyvale, CA (US); Amber Roy Chowdhury, Bellevue, WA (US); Ming-Chi Tsai, Belmont, CA (US); Abhaya Parthy, Palo Alto, CA (US); Ming-Jun Chen, Sunnyvale, CA (US)

(73) Assignee: Groupon, Inc., Chicago, IL (US)

( * ) Notice: Subject to any disclaimer, the term of this patent is extended or adjusted under 35 U.S.C. 154(b) by 736 days.

(21) Appl. No.: 15/281,656

(22) Filed: Sep. 30, 2016

Related U.S. Application Data

(60) Provisional application No. 62/234,960, filed on Sep. 30, 2015.

(51) Int. Cl.
*G06Q 30/02* (2012.01)
*G06F 7/08* (2006.01)

(52) U.S. Cl.
CPC .......... *G06Q 30/0282* (2013.01); *G06F 7/08* (2013.01)

(58) Field of Classification Search
None
See application file for complete search history.

(56) References Cited

U.S. PATENT DOCUMENTS

| | | | | |
|---|---|---|---|---|
| 7,295,995 B1* | 11/2007 | York | ...................... | G06Q 30/02 705/26.8 |
| 8,095,582 B2* | 1/2012 | Cramer | .............. | G06Q 30/0244 707/723 |
| 2005/0216457 A1* | 9/2005 | Walther | .............. | G06F 16/9558 |
| 2005/0256866 A1* | 11/2005 | Lu | ........................... | H04L 51/32 |
| 2007/0174124 A1* | 7/2007 | Zagofsky | ............... | G06Q 30/02 705/14.46 |
| 2007/0219988 A1* | 9/2007 | Mueller | ............... | G06Q 10/087 |
| 2008/0071929 A1* | 3/2008 | Motte | ..................... | H04L 67/20 709/246 |
| 2008/0201186 A1* | 8/2008 | Poon | .................. | G06Q 30/0242 705/14.69 |
| 2012/0158705 A1* | 6/2012 | Konig | ..................... | G06F 16/58 707/723 |
| 2014/0025668 A1* | 1/2014 | Lin | ..................... | G06F 16/9535 707/723 |

OTHER PUBLICATIONS

PowerReviews Team, Too Good to Be True: The Power of Negative Reviews, Sep. 24, 2015, (Year: 2015).*
Walz, "Deconstructing the App Store Rankings Formula with a Little Mad Science," May 27, 2015. (Year: 2015).*
U.S. Appl. No. 14/824,912, filed Aug. 12, 2015.

* cited by examiner

*Primary Examiner* — Yu Zhao
(74) *Attorney, Agent, or Firm* — Alston & Bird LLP

(57) ABSTRACT

In general, embodiments of the present invention provide systems, methods and computer readable media for dynamically augmenting relevance rankings using data from external ratings sources.

13 Claims, 10 Drawing Sheets

DYNAMIC AUGMENTING RELEVANCE RANKINGS USING DATA FROM EXTERNAL RATINGS SOURCES

CROSS REFERENCE TO RELATED APPLICATIONS

The present application claims the benefit of priority to U.S. Provisional Application Ser. No. 62/234,960, titled "Dynamic Augmenting of Relevance Rankings Using Data From External Ratings Sources," filed Sep. 30, 2015, the contents of which are incorporated by reference herein in their entirety.

FIELD

Embodiments of the invention relate, generally, to dynamically augmenting relevance rankings using data from external ratings sources.

BACKGROUND

Current methods for identifying offerings of most interest (i.e., most relevance) to consumers by using collected data describing attributes of the consumers and items being offered to the consumers for purchase exhibit a plurality of problems that make current systems insufficient, ineffective and/or the like. Through applied effort, ingenuity, and innovation, solutions to improve such methods have been realized and are described in connection with embodiments of the present invention.

SUMMARY

In general, embodiments of the present invention provide herein systems, methods and computer readable media to dynamically augment relevance rankings using data from external ratings sources.

Relevance systems are implemented to optimize their performance for various aspects of a business. For example, batch systems support business use cases such as targeted electronic messaging to consumers about available offerings. Real time systems support business use cases such as responding to search queries. Separate code bases leads to duplicate efforts and over-diversification of both the architecture and production systems. Incremental improvements to each code base in response to short business focus may lead to high development and operational costs.

In embodiments, a relevance service framework has been implemented to address these problems as well as to be able to scale gracefully as the business grows by horizontal scaling without practical limitation to numbers of item listings. In addition, the framework architecture meets performance requirements by supporting dynamic offerings whose attributes change on a real-time basis.

In embodiments, the relevance service is a plug-in framework to enable seamless integration of evolving code (e.g., personalization and relevance ranking) being developed in-house as well as by third parties. In embodiments, the framework meets architectural goals of performance and scalability, extensibility, accountability, and manageability while providing support for both real time and batch processing.

In embodiments, data from external ratings sources are used to augment evaluation of the relevance of items to be offered for purchase to consumers, especially in two aspects: (i) newly offered items might lack sufficient historical performance data used to compute relevance, and the data collected from external ratings sources will augment the computations; and (ii) some consumers (especially new consumers), may have experience with and thus trust in data that come from external ratings sources (e.g., Yelp and TripAdvisor), so the addition of the ratings data from those sources can be an incentive for those consumers to proceed to purchase recommended items.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 9:
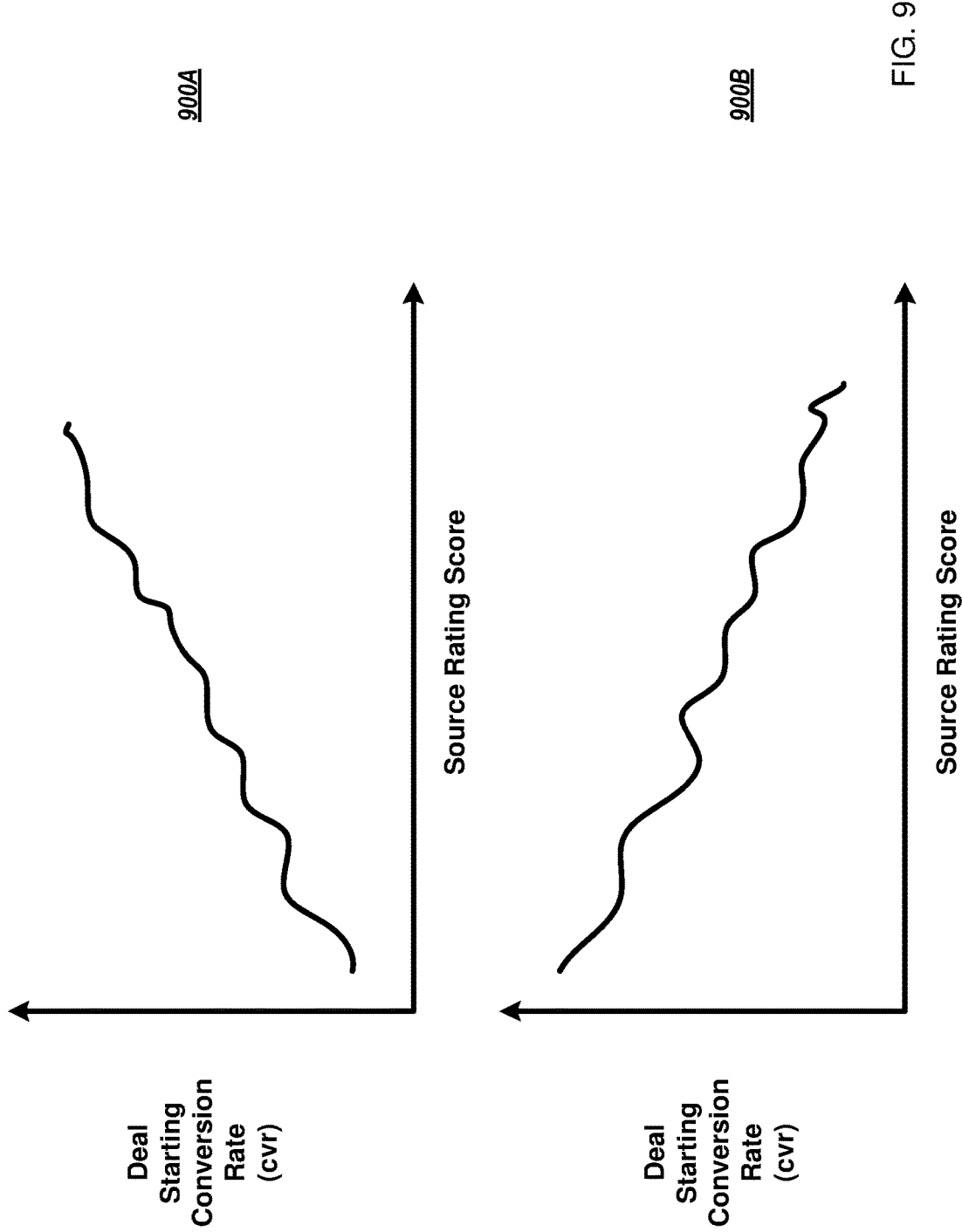
Figure 10:
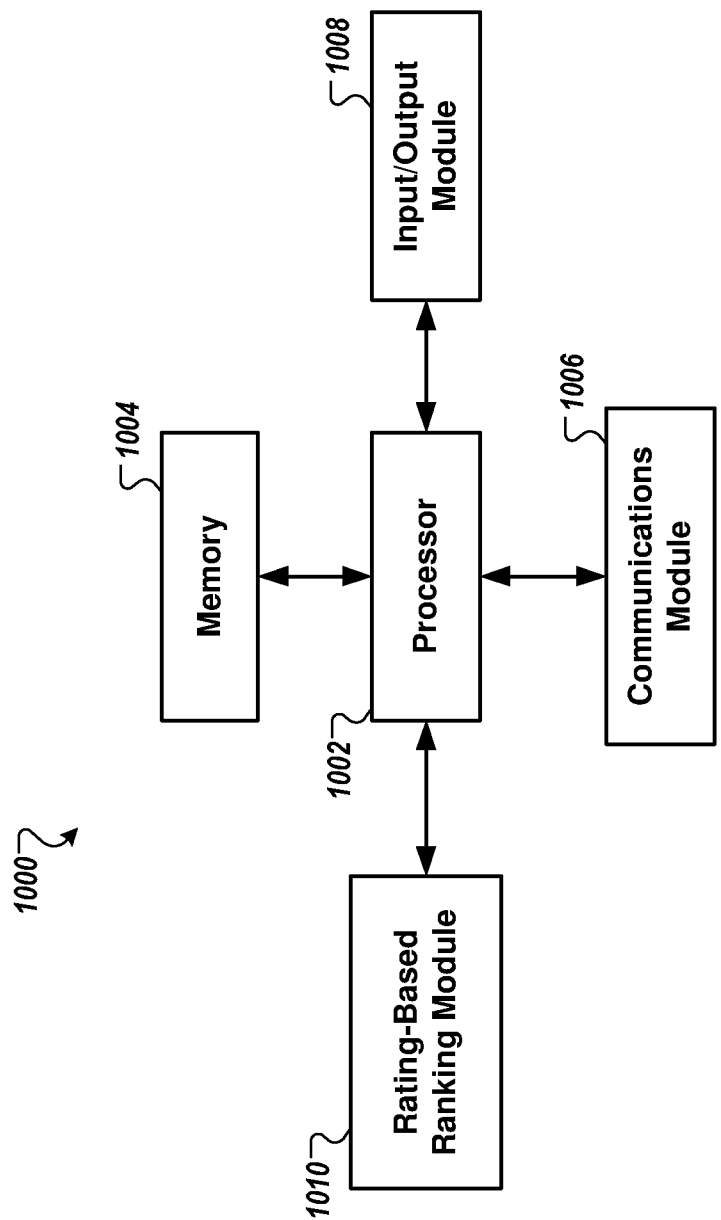

FIG. 9 is an illustration of two exemplary correlation graphs depicting the correlation between a deal's starting cvr and external ratings score from a single ratings source in accordance with some embodiments discussed herein; and FIG. 10 illustrates a schematic block diagram of circuitry that can be included in a computing device, such as a sorting-by-rating platform, in accordance with some embodiments discussed herein.

DETAILED DESCRIPTION

The present invention now will be described more fully hereinafter with reference to the accompanying drawings, in which some, but not all embodiments of the invention are shown. Indeed, this invention may be embodied in many different forms and should not be construed as being limited to the embodiments set forth herein; rather, these embodiments are provided so that this disclosure will satisfy applicable legal requirements. Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

As used herein, the terms "trilateral inventory object" and "deal" may be used interchangeably to refer to a data instance or entity representing an agreement by a provider to provide particular goods, services and/or experiences to a user in response to receiving a user acceptance indication from an offering service. A trilateral inventory object is described by a set of transaction attributes, including data describing the provider, offering service to user transaction terms, and provider to offering service transaction terms, and a time period during which the trilateral inventory object is valid.

As used herein, the terms "offering service" and "deal offering service" may refer, without limitation, to a service that is accessible via one or more computing devices and is operable to offer deals for purchase to consumers. A deal offering service maintains an inventory of deals, from which it generates deal offering programs. A deal offering program includes a set of deals, most typically deals that are instances of the same deal entity. A deal offering program is described by a set of deal program attributes including the quantity of deals in the program, the time period during which the program is active, and, optionally, a rate of deal offering during the program.

A deal offering service is configured to offer a deal as an instrument that is redeemable by a consumer who purchases the deal for the goods, services, and/or experiences specified in the agreement. The deal offering service is further configured to illustrate or otherwise inform one or more consumers of the availability of one or more instruments in the form of one or more impressions. In some examples, the deal offering service may also take the form of a redemption authority, a payment processor, a rewards provider, an entity in a financial network, a promoter, an agent and/or the like. As such, the service is, in some example embodiments, configured to present one or more deals via one or more impressions, accept payments for deals from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may be used to refer, without limitation, to a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce.

As used herein, the term "instrument" may be used, without limitation, to refer to any type of gift card, tender, electronic certificate, medium of exchange, voucher, or the like that embodies the terms of the deal from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value.

As used herein, the term "impression" may be used, without limitation, to refer to a communication, a display, or other perceived indication, such as a flyer, print media, e-mail, text message, application alert, mobile applications, other type of electronic interface or distribution channel and/or the like, of one or more deals.

As used herein, the terms "consumer," "customer," and "user" may be used interchangeably to refer, without limitation, to a client, customer, purchaser, shopper, user or the like who may be in the position to or does exchange value for one or more instruments under the terms defined by the one or more deals.

Figure 1:
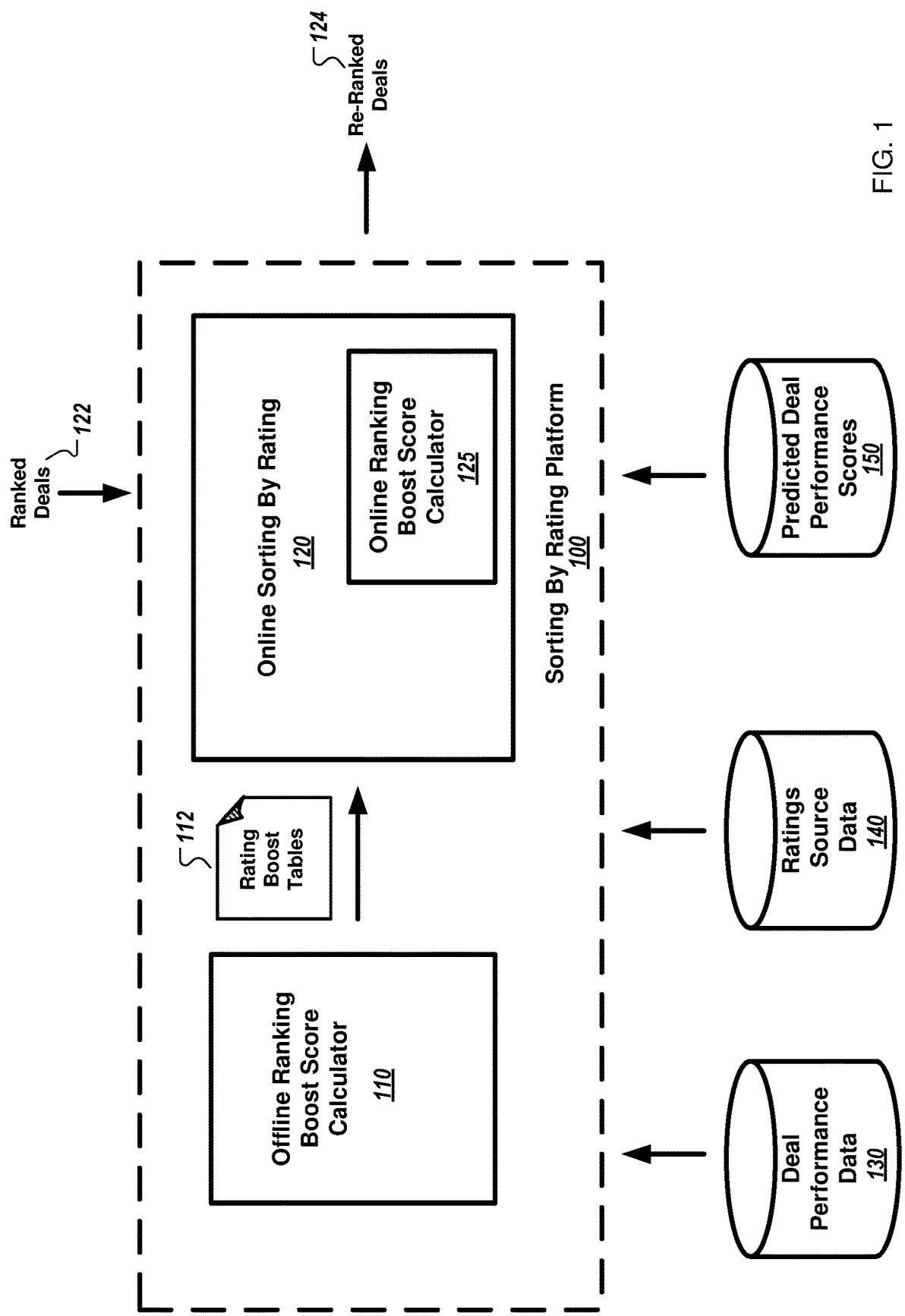
FIG. 1 illustrates an example system that can be configured to implement a sorting-by-rating platform in accordance with some embodiments discussed herein.

FIG. 1 illustrates an example system 100 that can be configured to implement a sorting-by-rating platform. In embodiments, the system 100 receives a ranked set of deals 122, each of which is associated with a relevance score; the set of deals 122 is ranked based on their respective relevance scores. In embodiments, the system updates the relevance scores based on integrating rating data for the deals collected from at least one external ratings source, and outputs the set of deals 124, re-ranked based on their respective updated scores.

In embodiments, sorting-by-rating platform 100 includes an online sorting by ranking module 120 that receives the input ranked deals 122, calculates the updated relevance scores, and outputs the re-ranked set of deals 124. In various embodiments, the sorting-by-rating platform 100 calculates the updated relevance scores based on one or a combination of input from an offline ranking boost score calculator 110, which generates a set of rating boost tables 112 including scaling factor data associated with deal categories and category subranges of the external rating source data; and input from an online ranking boost score calculator 125, which calculates updated relevance scores. In some embodiments, the online ranking boost score calculator 125 calculates the updated relevance scores based on stored predicted deal performance scores that were generated offline by a machine learning predictive model. In some alternative embodiments, the online ranking boost score calculator 125 calculates the updated relevance scores using the set of rating boost tables 112 that were generated offline by the offline ranking boost score calculator 110. In some embodiments, ranking boost score calculation is based on one or a combination of stored historical deal performance data 130 and stored ratings data collected from at least one external ratings source.

Figure 2:
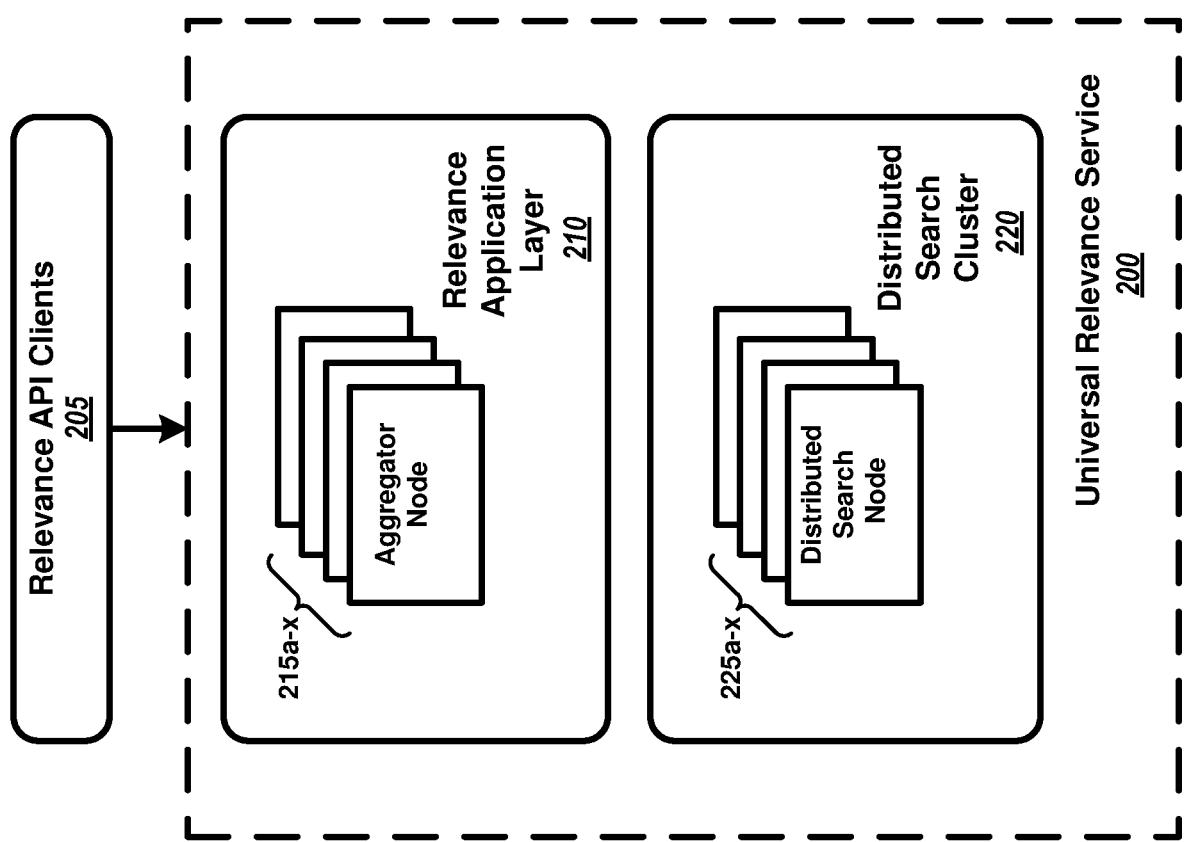
FIG. 2 illustrates an example system that can be configured to implement a real time universal relevance service framework in accordance with some embodiments discussed herein.

FIG. 2 illustrates an example system that can be configured to implement a real time universal relevance service framework 200 as described, for example in U.S. patent application Ser. No. 14/824,912, entitled "Universal Relevance Service Framework," filed Aug. 12, 2015, and included herein in its entirety. In embodiments, system 200 comprises two separate layers: a relevance application layer 210 and a distributed search layer 220. Plugins written against a relevance framework Software Development Kit (SDK) may be deployed and executed in both layers. In some embodiments, a sorting-by-rating platform 100 is deployed and executed within the framework 200 as a plugin.

In embodiments, the implementation of a relevance service as a plug-in framework enables seamless integration of evolving code (e.g., personalization and relevance ranking) being developed in-house as well as by third parties. In embodiments, the framework meets architectural goals of performance and scalability, extensibility, accountability, and manageability while providing support for both real time and batch processing.

Typical batch relevance systems are based on a computing model that applies relevance algorithms for all users and all offerings (deals); conceptually, this algorithm, iterating over all users and again over all deals, may be implemented as a series of pipelines consisting of multiple Hadoop MapReduce jobs. This means that accessing the results of a particular batch relevance computation will be limited to the requestor of the computation.

In embodiments, the relevance service makes use of a continuous background computation model. Data sources used for batch (and real time indexing) are all available as streams of data. These streams can be used to trigger re-computation of affected relevance scores. For example, receiving updated purchase information for a user can trigger the computation of deal scores for that user. Receiving new information about how many units of a particular deal have been sold can trigger recalculation of scores for that particular deal. This then effectively becomes a model of background computation for partial scores, more specifically those scores that are independent of real time information that come with a request (such as location, time of day, etc.).

As a result, a background computation system always contains all the scores and rankings necessary to perform the functions that currently depend on batch, e.g., Email send & push notifications. In addition, the background computation system can push these partial scores and rankings periodically into the real time system (e.g., ElasticSearch index) which can use them as is and doesn't have to compute them itself. This has the potential of significantly reducing latency for real time processing.

Additionally, in embodiments, the relevance system can decouple signal processing from servicing relevance computation requests by including a feature engineering infrastructure and real time data stores. Additionally, on-demand computation also has the side-effect that active users leverage compute resources more than non-active users. This enables performance improvements over typical systems based on models that treat all users equivalently, expending compute resources uniformly even if a user has not purchased anything in months.

Turning to FIG. 2, relevance application layer 210 is the user-facing component and includes one or more aggregator nodes 215a-x that are fronted by at least one load balancer. Relevance API clients 205 only will interface with these nodes. Aggregator nodes 215a-x thus expose the relevance service API and implement authorization and rate-limiting of clients 205 as well as perform a portion of the relevance processing algorithms (e.g., sorting and ranking).

In embodiments, distributed search cluster 220 includes one or more distributed search nodes 225a-x and is internal to the system 200 (i.e., is not available for direct interaction from the relevance API clients 205). In various embodiments, distributed search cluster 220 may be implemented based on one or a combination of distributed search servers (e.g., open-source distributed search servers ElasticSearch, Solr, and Apache Lucene). The choice of distributed search server underlying the distributed search cluster 220 would be apparent to others having ordinary skill in the art. In embodiments, the universal relevance service framework code is deployed as distributed search server plugins that implement functions such as item ranking/scoring such as, in some embodiments, sorting by ranking platform 100.

In embodiments, an aggregator node 215 generates and sends one or more product-specific searches to the distributed search cluster 220. In some embodiments, each product-specific search may include embedded data to be used in ranking/scoring of search results. In some embodiments in which the distributed search cluster supports a multi-query interface, the system generates a multi-query that includes multiple product searches 242a-x that may be executed in parallel by the distributed search cluster 220 against the product index.

Figure 3:
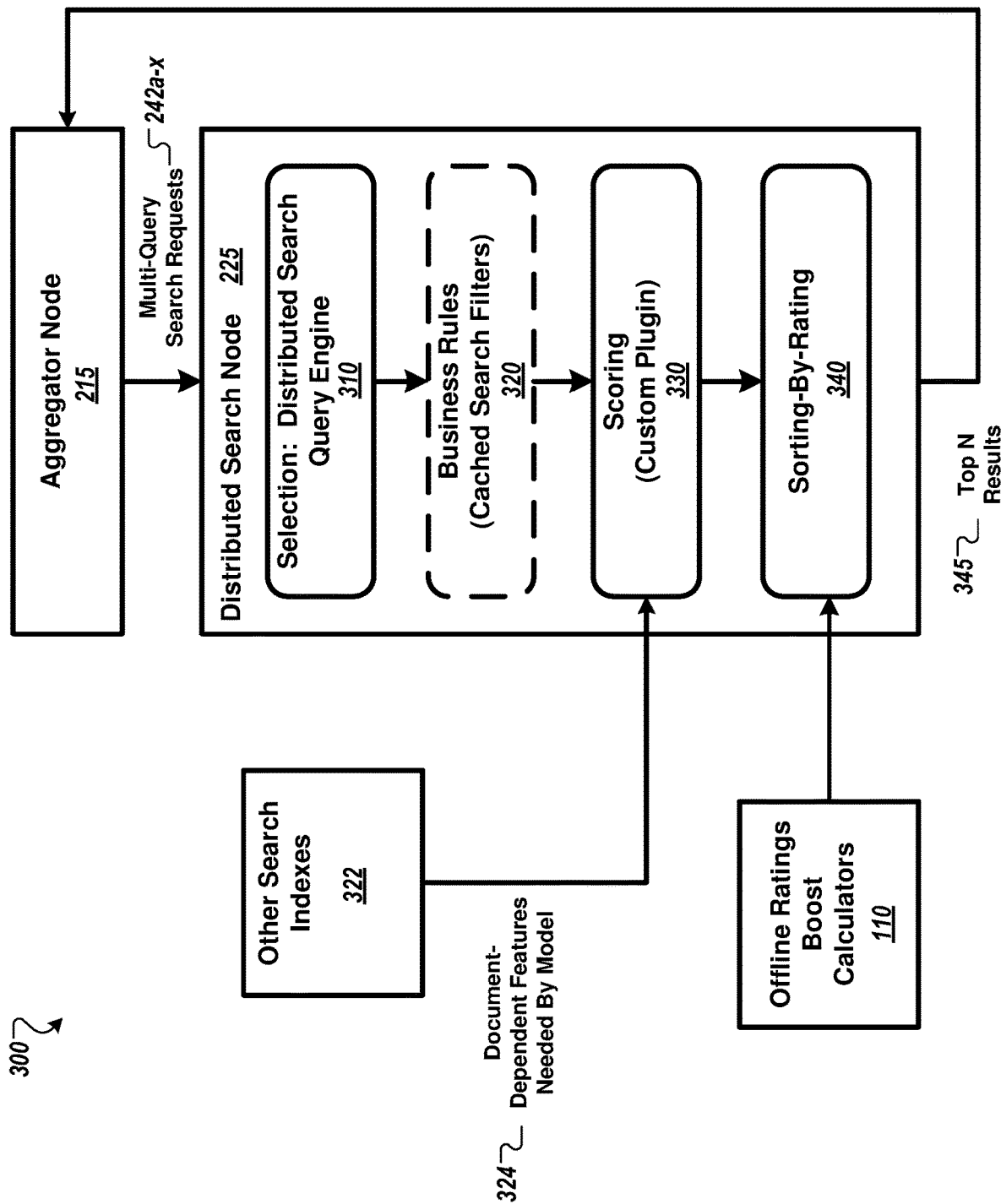
FIG. 3 illustrates the logical flow of processing by a distributed search node in response to receiving a multi-query search from an aggregator node in accordance with some embodiments discussed herein.

FIG. 3 illustrates the logical flow of processing by a distributed search node 225 in response to receiving a multi-query search 242a-x from an aggregator node 215. In some embodiments, processing of a multi-query search may be sharded to be processed in parallel. In some embodiments, the distributed search node query engine implements selection of items 310 based on the data in the received search documents.

In some embodiments, the selected items optionally may be filtered according to item-level business rules 320.

In some embodiments, the selected items may be scored and ranked based on feature data that may come from multiple sources including one or a combination of the search payload (document-independent data such as context and request data); document-specific data; and document-dependent features 324 retrieved from other search indexes 322 that may be local or may be accessed through feature services 222. In some embodiments, ranking/scoring is implemented by a custom plugin 330.

In some embodiments, the ranking and scoring may be further augmented by a sorting-by-rating platform plugin 340.

In embodiments, the top N ranked results 345 are returned to the aggregator note 115 that initiated the multi-query search. In some embodiments in which processing is implemented using sharding, the top N ranked results 345 are selected during rollup of the shard ranking results. In some embodiments, the value of N may be configurable and fetch limits may be applied (for example, fetch limits may be applied per client and/or per context).

In some embodiments, the top N results rankings may be adjusted in the aggregator node 115 by per-product and/or cross-product re-ranking and co-ranking.

Figure 4:
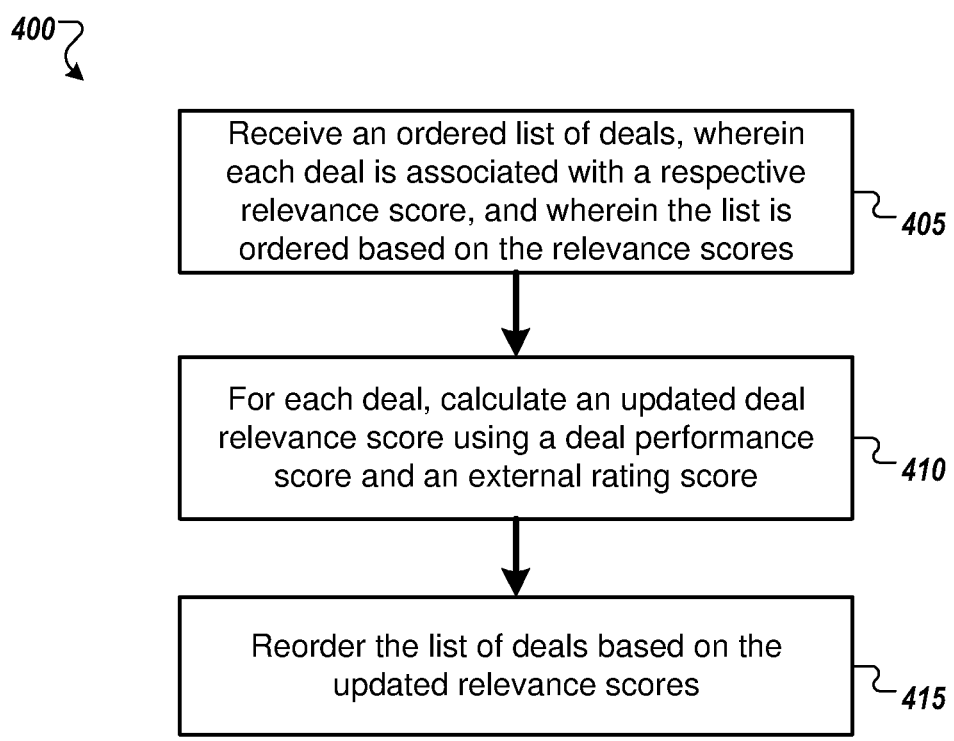
FIG. 4 is a flow diagram of an example method for dynamically updating the ranking of a set of deals using sorting-by-rating in accordance with some embodiments discussed herein.

FIG. 4 is a flow diagram of an example method 400 for dynamically updating the ranking of a set of deals using sorting-by-rating. For convenience, the method 400 will be described with respect to a system that includes one or more computing devices and performs the method 400. Specifically, the method 400 will be described with respect to processing of a set of ranked deals 122 by sort-by rating platform 100.

In embodiments, the system receives 405 an ordered list of deals. In some embodiments in which sort-by-rating augments the ranking of a set of deals being processed by a universal relevance service framework 200, the ordered list of deals is ranked based on respective relevance scores associated with the set of deals.

In embodiments, the system calculates 410 an updated relevance score for each of the set of deals using a deal performance score and an external rating score.

In some embodiments, the deal performance score is calculated using deal feature data including one or a combination of Odds (past performance data (historical conversion) computed from jointed user and deal attributes); DDO (past deal performance, based on mapping an individual deal's performance data to all users similar to the given user); Similarity (a computation of the likelihood that a given user's preference is similar to the given deal); Freshness (a possible penalty based on whether this particular deal has been exposed previously to a particular user); and Purchase Backoff (similar to freshness, but instead a possible penalty if the given user has purchased the particular deal recently). In some embodiments, the deal performance score can be calculated based at least in part on the deal conversion rate (cvr).

In some embodiments, the external rating score is calculated using star rating data collected from at least one external ratings source. In some embodiments, each rating source provides a set of star rating levels (e.g., 1 star, 2 stars, . . . , n stars), each level representing a level of quality to be applied to the entity being rated. A consumer rates an entity by voting for one of the star rating levels. For example, given a rating source providing a total of 5 star rating levels with 1 star being the lowest level of quality and 5 stars being the highest level of quality, a customer voting after a good restaurant experience may vote 4 or 5 stars for a restaurant, while another customer voting after a bad restaurant experience may vote 1 star.

In some embodiments, the updated relevance score is a predicted relevance score generated by a predictive model derived using machine learning, and based on a set of input feature data that include both deal performance features and collected external rating data. In some embodiments, the updated relevance score is a value that has been normalized to be between 0 and 1.

In some embodiments, the set of input feature data used by the machine learning derived predictive model includes data obtained through a restful API interface. In some embodiments, the input feature data includes data obtained from HDFS files on an open source, Java-based programming framework that supports the processing and storage of extremely large data sets in a distributed computing environment (e.g., Hadoop). In some embodiments, external rating data is collected using a plugin type architecture for obtaining data from existing or newly added external data sources.

In some embodiments, the system calculates an updated deal relevance score using a calculated boost factor based on deal performance and an external rating score. Calculation of an external rating score will be described in detail with reference to method 500 depicted in FIG. 5. Calculation of a boost scaling factor will be described in detail with reference to methods 600-700 depicted in FIGS. 6-7. Calculation of an updated deal relevance score will be described in detail with reference to method 800 depicted in FIG. 8.

In embodiments, the system re-ranks 420 the set of deals using their respective updated deal relevance scores.

Figure 5:
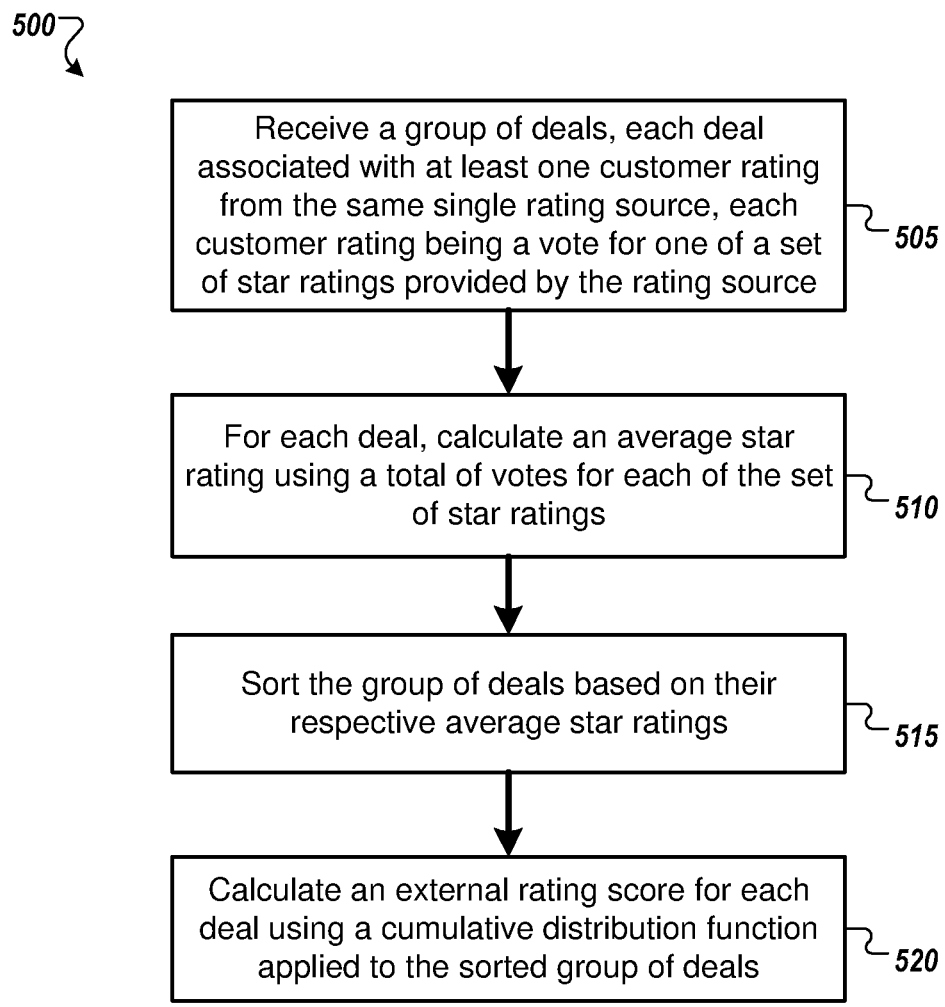
FIG. 5 is a flow diagram of an example method for calculating an external rating score for each deal in a group of deals in accordance with some embodiments discussed herein.

FIG. 5 is a flow diagram of an example method 500 for calculating an external rating score for each deal in a group of deals. For convenience, the method 500 will be described with respect to a system that includes one or more computing devices and performs the method 500. Specifically, the method 500 will be described with respect to calculating the external rating score used in step 410 of method 400.

In embodiments, the system receives 505 a group of deals, each deal associated with at least one customer rating from the same single rating source, each customer rating being a vote for one of a set of star ratings provided by the rating source. For example, for a Deal A, a set of star ratings (votes) from an external rating source with a star rating range of 1-5 would be {(1, 20), (2, 45), (3, 90), (4, 87), (5, 0)}.

In embodiments, for each deal i, the system calculates an average star rating according to the equation:

$$\overline{x_i} = \sum_{r=1}^{N} r * v_r / V_i \qquad \text{Equation 1}$$

where N is the maximum value of star rating r (minimum value is assumed to be 1), $V_i$ is the total number of votes for deal i, and $v_r$ is the number of votes for deal i at rating r.

In embodiments, the system 515 sorts the group of deals based on their respective average star ratings.

In embodiments, the system calculates an external rating score for each deal using a cumulative distribution function (cdf) applied to the sorted group of deals. For example, if a deal's cdf is 75%, then its external rating score is 0.75.

In some embodiments, a minimum number (i.e., a threshold) of unique ratings is required to be considered sufficient to be used for modifying an external rating score. If the threshold is not reached, the external rating score is ignored. In some embodiments, the threshold is computed independently for each external data source. In some embodiments, depending on the external data source, the external rating score is either applied for a threshold number of days until sufficient data was collected on deal conversion rate, or used to modify the external rating score permanently.

Figure 6:
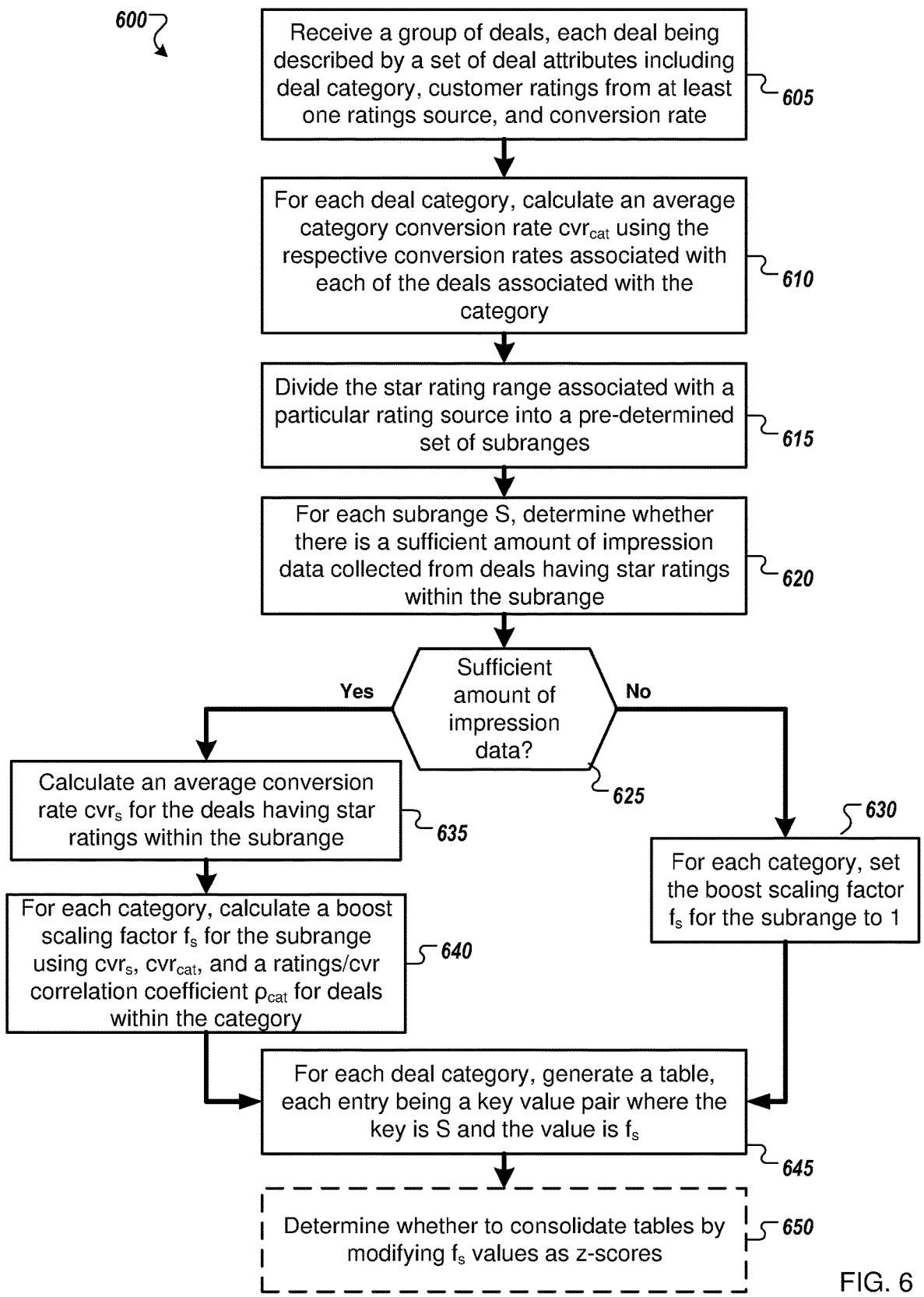
FIG. 6 is a flow diagram of an example method for offline calculation of a boost scaling factor in accordance with some embodiments discussed herein.

FIG. 6 is a flow diagram of an example method 600 for offline calculation of a boost scaling factor. For convenience, the method 600 will be described with respect to a system that includes one or more computing devices and performs the method 600. Specifically, the method 600 will be described with respect to calculating an updated deal relevance score in step 410 of method 400.

In embodiments, the system receives 605 a group of deals, each deal being described by a set of deal attributes including deal category, customer ratings from at least one ratings source, and conversion rate (cvr).

In embodiments, For each deal category, the system calculates 610 an average category conversion rate $cvr_{cat}$ using the respective conversion rates associated with each of the deals associated with the category $cvr_i$, as described in the equation $$cvr_{cat} = \sum_{i=1}^{N} cvr_i \qquad \text{Equation 2}$$

where N is the total number of deals within this category. In embodiments, $cvr_i$, can be calculated as a deal's average rating $\overline{x}_i$ as described, for example, in Equation 1.

In embodiments, the system divides 615 the star rating range associated with a particular rating source into a pre-determined set of subranges. In some embodiments, the size of the set of subranges is configurable. In some embodiments, the size of the set of subranges is determined so that each subrange contains the same quantity of deals. For example, in some embodiments, a ranking range (1-5) can be divided into 3 subranges (1-2.5, 2.5-3.9, 3.9-5), with each subrange S including 33% of the deals under a particular category.

In embodiments, for each subrange S, the system determines 620 whether there is a sufficient amount of impression data collected from deals having star ratings within the subrange. In some embodiments, determining whether there is a sufficient amount of impression data includes calculating a sum of impressions collected for all of the deals associated with the subrange and comparing that sum to a sufficient data threshold. For example, a subrange associated with 20 deals, each with data collected from 20,000 impressions, may satisfy a sufficient data threshold.

In an instance in which it is determined that there is not a sufficient amount of impression data 625, in embodiments, the system sets 630 the boost scaling factor $f_s$ for the subrange S to 1 for each category (i.e., do not apply a scaling factor).

In an instance in which it is determined that there is a sufficient amount of impression data 625, in embodiments, the system calculates 635 an average conversion rate $cvr_s$ for the deals having star ratings within the subrange S according to the equation $$cvr_s = \sum_{i=s_1}^{s_n} pur_i \Big/ \sum_{i=s_1}^{s_n} Imp_i \qquad \text{Equation 3}$$

Where $(s_1, s_2, \ldots, s_n)$ are the deals whose average ratings belong to rating subrange S, $pur_i$ is the quantity of purchases made for deal i, and $Imp_i$ is the quantity of impressions collected for deal i.

In embodiments, for each category, the system calculates 640 a boost scaling factor $f_s$ for the subrange using $cvr_s$, $cvr_{cat}$, and a ratings/cvr correlation coefficient $\rho_{cat}$ for deals within the category, where $-1 \leq \rho_{cat} \leq 1$. In embodiments, $f_s$ is calculated according to the equation $$f_s = (cvr_s/cvr_{cat})^{\rho_{cat}}$$

In some embodiments, if the number of impressions collected for a deal is greater than a collected impressions quantity threshold (e.g., 30,000 impressions), there may also be a large amount of performance data (e.g., Odds and DDO data) collected for that deal. Thus, in this case, the boost to the deal's relevance score due to integration of external ratings data may be weighted less, according to an equation $$f_s = (cvr_s/cvr_{cat})^{\rho_{cat} * \min(1, t/imp_i)} \qquad \text{Equation 4}$$

where t is an impression threshold and $imp_i$ is the number of impressions of deal i.

In embodiments, a scaling factor is not applied (i.e., $f_s$ is set to 1) when $\rho_{cat}$ is $\leq 0$.

In some embodiments, method 600 is executed periodically (e.g., once per day), and a set of boost tables is generated for dynamic access by the online sorting-by-rating platform 120.

In embodiments, for each deal category, the system generates 645 a boost table, each table entry being a key value pair where the key is S and the value is $f_s$.

In some embodiments, the system optionally optimizes the set of generated boost tables by determining 650 whether to consolidate tables. In some embodiments, for example, the distributions of two tables can be compared to see if they are the same (thus enabling the tables to be consolidated) by first modifying $f_s$ into a z-score $z_s$ according to the equation $$z_s = (f_s - \overline{f})/\sigma_{f_s} \qquad \text{Equation 5}$$

where $$\overline{f}_s = \frac{1}{N_s}\sum_{s=1}^{N_s} f_s \text{ and } \sigma_s = \sqrt{\frac{(f_s - \overline{f})^2}{N_s - 1}}.$$

Figure 7:
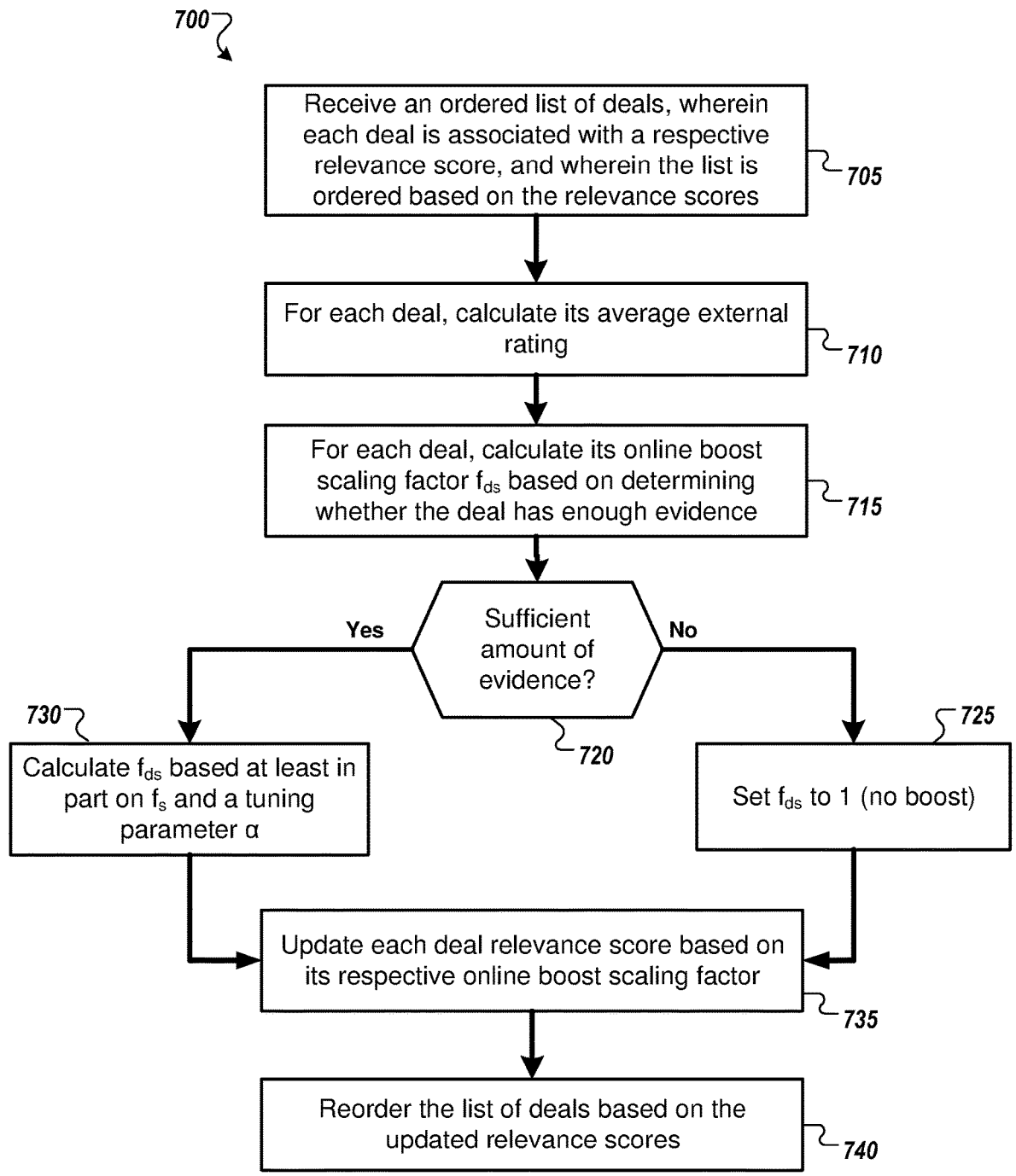
FIG. 7 is a flow diagram of an example method for dynamically updating the ranking of a set of deals based on a boost scaling factor calculated from external ratings collected from a single ratings source in accordance with some embodiments discussed herein.

FIG. 7 is a flow diagram of an example method 700 for dynamically updating the ranking of a set of deals based on a boost scaling factor calculated from external ratings collected from a single ratings source. For convenience, the method 700 will be described with respect to a system that includes one or more computing devices and performs the method 700. Specifically, the method 700 will be described with respect to implementing the steps 405, 510, and 415 of method 400.

In embodiments, the system receives 705 an ordered list of deals, wherein each deal is associated with a respective relevance score, and wherein the list is ordered based on the relevance scores.

In embodiments, for each deal i, the system calculates 710 its average external rating $\overline{x}_i$ as described, for example, in Equation 1.

In embodiments, for each deal, the system calculates 715 its online boost scaling factor $f_{ds}$ based on determining whether the deal has enough evidence. In some embodiments, for example, determining whether a deal has enough evidence includes calculating a sum of the total number of votes collected for the deal and comparing the sum to a sufficient evidence threshold value (e.g., 30 votes).

In an instance in which it is determined that there is not a sufficient amount of evidence 720, in embodiments, the system sets 725 the boost scaling factor $f_s$ for the subrange S to 1 for each category (i.e., do not apply a scaling factor).

In an instance in which it is determined that there is a sufficient amount of evidence 720, in embodiments, the system calculates 730 $f_{ds}$ based at least in part on $f_s$ and a tuning parameter $\alpha$, which is a tuning parameter with a value typically between 0 and 1.

In some embodiments, $f_s$ is retrieved from a set of boost tables generated offline according to method 600 as depicted in FIG. 6.

In embodiments, the system updates 735 each deal relevance score based on its respective online boost scaling factor, and then reorders the list of deals 740 based on the updated relevance scores.

Figure 8:
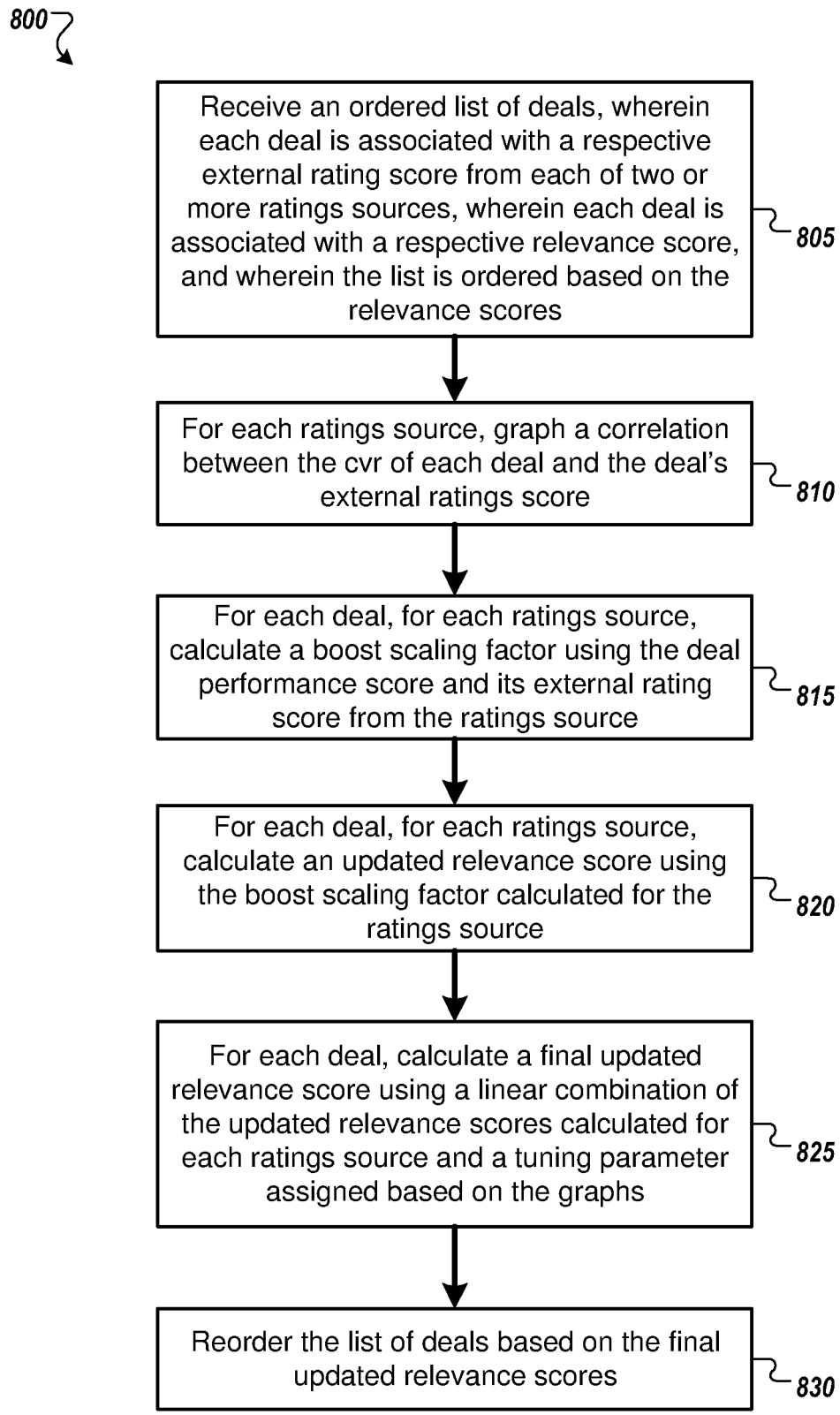
FIG. 8 is a flow diagram of an example method for dynamically updating the ranking of a set of deals based on a boost scaling factor calculated from external ratings collected from multiple ratings sources in accordance with some embodiments discussed herein.

FIG. 8 is a flow diagram of an example method 800 for dynamically updating the ranking of a set of deals based on a boost scaling factor calculated from external ratings collected from multiple ratings sources. For convenience, the method 800 will be described with respect to a system that includes one or more computing devices and performs the method 800. Specifically, the method 200 will be described with respect to implementing the steps 405, 510, and 415 of method 400.

In embodiments, the system receives 805 an ordered list of deals, wherein each deal is associated with a respective external rating score from each of two or more ratings sources, wherein each deal is associated with a respective relevance score, and wherein the list is ordered based on the relevance scores.

In embodiments, for each ratings source the system graphs 815 a correlation between the cvr of each deal and the deal's external ratings score ($(x_i, y_i)$ are the (rating score, cvr) of deal i). Exemplary graphs will be described with reference to FIG. 9.

For each deal, for each ratings source, the system calculates 815 a boost scaling factor using the deal performance score and its external rating score from the ratings source.

For each deal, the system calculates 825 a final updated relevance score S using a linear combination of the updated relevance scores $S_i$ calculated for the deal for each ratings source i and a tuning parameter $\alpha_i$ assigned based on the graphs according to the equation $$S = \sum_{i=1}^{n} \alpha_i S_i \qquad \text{Equation 6}$$

where $$\sum_{i=1}^{n} \alpha_i = 1.$$

In some embodiments, the value of $\alpha_i$ is based on the correlation between the deal's external rating score and cvr, and the value can be determined based on the correlation graph.

FIG. 9 is an illustration of two exemplary correlation graphs depicting the correlation between a deal's starting cvr and external ratings score from a single source ($(x_i, y_i)$ are the (rating score, cvr) of deal i). The examples are for illustration and not for limitation.

Graph 900A is an example of a correlation close to the ideal correlation, where y=x. In this case, the value of a tuning parameter $\alpha_i$ for rating source i would be assigned so that the updated relevance score $S_i$ calculated for the deal is weighted more heavily in the linear combination of updated relevance scores as described for step 825 in method 800.

Graph 900 B is an example of a correlation for which the value of $\alpha_i$ for rating source i would be assigned so that the updated relevance score $S_i$ calculated for the deal is weighted less in the linear combination of updated relevance scores.

FIG. 10 shows a schematic block diagram of circuitry 1000, some or all of which may be included in, for example, sorting-by-rating system 100. As illustrated in FIG. 10, in accordance with some example embodiments, circuitry 1000 can include various means, such as processor 1002, memory 1004, communications module 1006, and/or input/output module 1008. As referred to herein, "module" includes hardware, software and/or firmware configured to perform one or more particular functions. In this regard, the means of circuitry 1000 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 1004) that is executable by a suitably configured processing device (e.g., processor 1002), or some combination thereof.

Processor 1002 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 10 as a single processor, in some embodiments, processor 1002 comprises a plurality of processors. The plurality of processors may be embodied on a single computing device or may be distributed across a plurality of computing devices collectively configured to function as circuitry 1000. The plurality of processors may be in operative communication with each other and may be collectively configured to perform one or more functionalities of circuitry 1000 as described herein. In an example embodiment, processor 1002 is configured to execute instructions stored in memory 1004 or otherwise accessible to processor 1002. These instructions, when executed by processor 1002, may cause circuitry 1000 to perform one or more of the functionalities of circuitry 1000 as described herein.

Whether configured by hardware, firmware/software methods, or by a combination thereof, processor 1002 may comprise an entity capable of performing operations according to embodiments of the present invention while configured accordingly. Thus, for example, when processor 1002 is embodied as an ASIC, FPGA or the like, processor 1002 may comprise specifically configured hardware for conducting one or more operations described herein. Alternatively, as another example, when processor 1002 is embodied as an executor of instructions, such as may be stored in memory 1004, the instructions may specifically configure processor 1002 to perform one or more algorithms and operations described herein, such as those discussed in connection with FIGS. 1-3.

Memory 1004 may comprise, for example, volatile memory, non-volatile memory, or some combination thereof. Although illustrated in FIG. 10 as a single memory, memory 1004 may comprise a plurality of memory components. The plurality of memory components may be embodied on a single computing device or distributed across a plurality of computing devices. In various embodiments, memory 1004 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 1004 may be configured to store information, data (including analytics data), applications, instructions, or the like for enabling circuitry 1000 to carry out various functions in accordance with example embodiments of the present invention. For example, in at least some embodiments, memory 1004 is configured to buffer input data for processing by processor 1002. Additionally or alternatively, in at least some embodiments, memory 1004 is configured to store program instructions for execution by processor 1002. Memory 1004 may store information in the form of static and/or dynamic information. This stored information may be stored and/or used by circuitry 1000 during the course of performing its functionalities.

Communications module 1006 may be embodied as any device or means embodied in circuitry, hardware, a computer program product comprising computer readable program instructions stored on a computer readable medium (e.g., memory 1004) and executed by a processing device (e.g., processor 1002), or a combination thereof that is configured to receive and/or transmit data from/to another device, such as, for example, a second circuitry 1000 and/or the like. In some embodiments, communications module 1006 (like other components discussed herein) can be at least partially embodied as or otherwise controlled by processor 1002. In this regard, communications module 1006 may be in communication with processor 1002, such as via a bus. Communications module 1006 may include, for example, an antenna, a transmitter, a receiver, a transceiver, network interface card and/or supporting hardware and/or firmware/software for enabling communications with another computing device. Communications module 1006 may be configured to receive and/or transmit any data that may be stored by memory 1004 using any protocol that may be used for communications between computing devices. Communications module 1006 may additionally or alternatively be in communication with the memory 1004, input/output module 1008 and/or any other component of circuitry 1000, such as via a bus.

Input/output module 1008 may be in communication with processor 1002 to receive an indication of a user input and/or to provide an audible, visual, mechanical, or other output to a user. Some example visual outputs that may be provided to a user by circuitry 1000 are discussed in connection with FIGS. 1-3. As such, input/output module 1008 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 1000 is embodied as a server or database, aspects of input/output module 1008 may be reduced as compared to embodiments where circuitry 1000 is implemented as an end-user machine or other type of device designed for complex user interactions. In some embodiments (like other components discussed herein), input/output module 1008 may even be eliminated from circuitry 1000. Alternatively, such as in embodiments wherein circuitry 1000 is embodied as a server or database, at least some aspects of input/output module 1008 may be embodied on an apparatus used by a user that is in communication with circuitry 1000. Input/output module 1008 may be in communication with the memory 1004, communications module 1006, and/or any other component(s), such as via a bus. Although more than one input/output module and/or other component can be included in circuitry 1000, only one is shown in FIG. 10 to avoid overcomplicating the drawing (like the other components discussed herein).

Sorting-by-rating module 1010 may also or instead be included and configured to perform the functionality discussed herein related to the sorting-by-rating discussed above. In some embodiments, some or all of the functionality of sorting-by-rating may be performed by processor 1002. In this regard, the example processes and algorithms discussed herein can be performed by at least one processor 1002 and/or sorting-by-rating module 1010. For example, non-transitory computer readable media can be configured to store firmware, one or more application programs, and/or other software, which include instructions and other computer-readable program code portions that can be executed to control each processor (e.g., processor 1002 and/or sorting-by-rating module 1010) of the components of system 100 to implement various operations, including the examples shown above. As such, a series of computer-readable program code portions are embodied in one or more computer program products and can be used, with a computing device, server, and/or other programmable apparatus, to produce machine-implemented processes.

Any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of system 100. In some embodiments, one or more external systems (such as a remote cloud computing and/or data storage system) may also be leveraged to provide at least some of the functionality discussed herein.

As described above in this disclosure, aspects of embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 1002 and/or sorting-by-rating module 1010 discussed above with reference to FIG. 10, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 1004) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising one or more computers and one or more storage devices storing instructions that are operable, when executed by the one or more computers, to cause the one or more computers to implement operations, the operations comprising:
   receiving, using a processor and from an aggregator node via a first network connection, a multi-query search request, wherein the multi-query search request is received by the aggregator node via a second network connection and via a relevance service application programming interface (API) associated with a relevance service framework that comprises a distributed search server;
   retrieving, using the processor and from a memory, an ordered list of trilateral inventory objects of a plurality of trilateral inventory objects, wherein each trilateral inventory object of the ordered list of trilateral inventory objects is associated with a respective relevance score, and wherein the ordered list of trilateral inventory objects is ordered based on the relevance scores, wherein each trilateral inventory object of the ordered list of trilateral inventory objects is described by a set of trilateral inventory object attributes that change on a real-time basis, including a trilateral inventory object category, customer ratings from an external ratings source, and a conversion rate;
   retrieving, using the processor and from a memory, an ordered list of trilateral inventory objects, wherein each trilateral inventory object of the ordered list of trilateral inventory objects is associated with a respective relevance score, and wherein the ordered list of trilateral inventory objects is ordered based on the relevance scores, wherein each trilateral inventory object of the ordered list of trilateral inventory objects is described by a set of trilateral inventory object attributes including a trilateral inventory object category, customer ratings from an external ratings source, and a conversion rate;
   for each trilateral inventory object of the ordered list of trilateral inventory objects, calculating, using the processor and at least a distributed search node plugin of a distributed search server configured for relevance scoring of the trilateral inventory objects for a consumer identifier associated with a consumer device, an updated relevance score using a performance score and an external rating score, wherein calculating the updated relevance score comprises:
   for each trilateral inventory object category,
      calculating, using the processor, an average category conversion rate using the respective conversion rates associated with each of the trilateral inventory objects associated with the trilateral inventory object category;
      dividing, using the processor, a star rating range associated with the external ratings source into a pre-determined set of subranges;
   for each subrange of the pre-determined set of subranges,
      upon determining, using the processor, whether there is a sufficient amount of impression data collected from trilateral inventory objects having star ratings within the subrange, calculating, using the processor, an average conversion rate for the trilateral inventory objects having star ratings within the subrange; and
      for each trilateral inventory object category,
         calculating, using the processor, a boost scaling factor for the subrange using the average conversion rate for the subrange, the average conversion rate for the trilateral inventory object category, and a ratings/conversion rate correlation coefficient for trilateral inventory objects within the trilateral inventory object category; and
         setting, using the processor, the boost scaling factor for the subrange to 1;
   providing dynamically augmented relevance rankings for the plurality of trilateral inventory objects described by the set of trilateral inventory object attributes that change on a real-time basis by:
   reordering, using the processor, the ordered list of trilateral inventory objects based on the updated relevance scores to produce a reordered list of trilateral inventory objects;
   selecting, using the processor, a top N ranked number of trilateral inventory objects from the reordered list of trilateral inventory objects to render more relevant trilateral inventory objects, as compared to the ordered list of trilateral inventory objects, for the consumer identifier via an electronic interface of the consumer device;
   configuring the top N ranked number of trilateral inventory objects for real-time rendering via the electronic interface of the consumer device;
   providing, via the second network connection, the top N ranked number of trilateral inventory objects to the relevance service API; and
   transmitting, via the relevance service API and using a third network connection, real-time data associated with the top N ranked number of trilateral inventory objects to the consumer device to facilitate the real-time rendering of the top N ranked number of trilateral inventory objects via the electronic interface of the consumer device, wherein the top N ranked number of trilateral inventory objects are accessible via the electronic interface of the consumer device; and in response to receiving, via the relevance service API and using the third network connection, a user acceptance indication provided via user input to the electronic interface within a given time period that begins at the real-time rendering of the top N ranked number of trilateral inventory objects via the electronic interface, initiating, using the processor, redemption of a good, service or experience associated with at least one trilateral inventory object from the top N ranked number of trilateral inventory objects.

2. The system of claim 1, wherein the pre-determined set of subranges is configurable.

3. The system of claim 1, wherein calculating an updated relevance score is performed offline, and wherein the operations further comprise:

for each trilateral inventory object category, generating, using the processor, a table comprising a plurality of table entries, wherein each table entry of the plurality of table entries comprises a key value pair in which a key represents the subrange and a value represents the boost scaling factor.

4. The system of claim 3, the operations further comprising:

for each table, calculating, using the processor, z-scores using the boost scaling factor; and determining, using the processor, whether to consolidate a first table and a second table into a third table using the z-scores calculated for the first table and the second table.

5. The system of claim 1, wherein calculating the average category conversion rate using the respective conversion rates associated with each of the trilateral inventory objects associated with the trilateral inventory object category comprises:

for each trilateral inventory object, calculating, using the processor, an average star rating using a total of votes for each of the star ratings;

sorting, using the processor, the trilateral inventory objects based on their respective average star ratings; and calculating, using the processor, an external rating score for each trilateral inventory object using a cumulative distribution function applied to the sorted group of trilateral inventory objects.

6. A computer program product, stored on a non-transitory computer readable medium, comprising instructions that when executed on one or more computers cause the one or more computers to perform operations, the operations comprising:

receiving, using a processor and from an aggregator node via a first network connection, a multi-query search request, wherein the multi-query search request is received by the aggregator node via a second network connection and via a relevance service application programming interface (API) associated with a relevance service framework that comprises a distributed search server;

retrieving, using the processor and from a memory, an ordered list of trilateral inventory objects of a plurality of trilateral inventory objects, wherein each trilateral inventory object of the ordered list of trilateral inventory objects is associated with a respective relevance score, and wherein the ordered list of trilateral inventory objects is ordered based on the relevance scores, and wherein each trilateral inventory object of the ordered list of trilateral inventory objects is described by a set of trilateral inventory object attributes that change on a real-time basis, including a trilateral inventory object category, customer ratings from an external ratings source, and a conversion rate;

for each trilateral inventory object of the ordered list of trilateral inventory objects, calculating, using the processor and at least a distributed search node plugin of the distributed search server configured for relevance scoring of the trilateral inventory objects for a consumer identifier associated with a consumer device, its average external rating;

in an instance in which the trilateral inventory object is determined to be associated with enough evidence, calculating, using the processor, its online boost factor based at least in part on an offline boost scaling factor and a tuning parameter, wherein calculating the offline boost scaling factor comprises:

for each trilateral inventory object category, calculating, using the processor, an average category conversion rate using the respective conversion rates associated with each of the trilateral inventory objects associated with the trilateral inventory object category;

dividing, using the processor, a star rating range associated with the external ratings source into a pre-determined set of subranges; and for each of the pre-determined set of subranges, upon determining, using the processor, that there is a sufficient amount of impression data collected from trilateral inventory objects having star ratings within the subrange, calculating, using the processor, an average conversion rate for the trilateral inventory objects having star ratings within the subrange; and for each trilateral inventory object category, calculating, using the processor, a boost scaling factor for the subrange using the average conversion rate for the subrange, the average conversion rate for the trilateral inventory object category, and a ratings/conversion rate correlation coefficient for trilateral inventory objects within the trilateral inventory object category; and setting, using the processor, the boost scaling factor for the subrange to 1;

in an instance in which the trilateral inventory object is determined not to have enough evidence, setting, using the processor, the value of the online boost factor to 1;

providing dynamically augmented relevance rankings for the plurality of trilateral inventory objects described by the set of trilateral inventory object attributes that change on a real-time basis by:

updating, using the processor, each trilateral inventory object relevance score based on its respective online boost scaling factor; and reordering, using the processor, the ordered list of trilateral inventory objects based on the updated relevance scores to produce a reordered list of trilateral inventory objects;

selecting a top N ranked number of trilateral inventory objects from the reordered list of trilateral inventory objects to render more relevant trilateral inventory objects, as compared to the ordered list of trilateral inventory objects, for the consumer identifier via an electronic interface of the consumer device;

configuring the top N ranked number of trilateral inventory objects for real-time rendering via the electronic interface of the consumer device;

providing, via the second network connection, the top N ranked number of trilateral inventory objects to the relevance service API; and transmitting, via the relevance service API and using a third network connection, real-time data associated with the top N ranked number of trilateral inventory objects to the consumer device to facilitate the real-time rendering of the top N ranked number of trilateral inventory objects via the electronic interface of the consumer device, wherein the top N ranked number of trilateral inventory objects are accessible via the electronic interface of the consumer device; and in response to receiving, via the relevance service API and using the third network connection, a user acceptance indication provided via user input to the electronic interface within a given time period that begins at the real-time rendering of the top N ranked number of trilateral inventory objects via the electronic interface, initiating, using the processor, redemption of a good, service or experience associated with at least one trilateral inventory object from the top N ranked number of trilateral inventory objects.

7. The computer program product of claim 6, wherein the offline boost scaling factor is retrieved from a set of boost tables.

8. The computer program product of claim 6, wherein the pre-determined set of subranges is configurable.

9. A computer-implemented method, comprising:

receiving, using a processor and from an aggregator node via a first network connection, a multi-query search request, wherein the multi-query search request is received by the aggregator node via a second network connection and via a relevance service application programming interface (API) associated with a relevance service framework that comprises a distributed search server;

retrieving, using the processor and from a memory, an ordered list of trilateral inventory objects of a plurality of trilateral inventory objects, wherein each trilateral inventory object of the ordered list of trilateral inventory objects is associated with a respective relevance score, and wherein the ordered list of trilateral inventory objects is ordered based on the relevance scores, wherein each trilateral inventory object of the ordered list of trilateral inventory objects is described by a set of trilateral inventory object attributes that change on a real-time basis, including a trilateral inventory object category, customer ratings from an external ratings source, and a conversion rate;

for each trilateral inventory object of the ordered list of trilateral inventory objects, calculating, using the processor and at least a distributed search node plugin of the distributed search server configured for relevance scoring of the trilateral inventory objects for a consumer identifier associated with a consumer device, an updated relevance score using a performance score and an external rating score, wherein calculating the updated relevance score comprises:

for each trilateral inventory object category, calculating, using the processor, an average category conversion rate using the respective conversion rates associated with each of the trilateral inventory objects associated with the trilateral inventory object category;

dividing, using the processor, a star rating range associated with the external ratings source into a pre-determined set of subranges;

for each subrange of the pre-determined set of subranges, upon determining, using the processor, whether there is a sufficient amount of impression data collected from trilateral inventory objects having star ratings within the subrange, calculating, using the processor, an average conversion rate for the trilateral inventory objects having star ratings within the subrange; and for each trilateral inventory object category, calculating, using the processor, a boost scaling factor for the subrange using the average conversion rate for the subrange, the average conversion rate for the trilateral inventory object category, and a ratings/conversion rate correlation coefficient for trilateral inventory objects within the trilateral inventory object category; and setting, using the processor, the boost scaling factor for the subrange to 1;

providing dynamically augmented relevance rankings for the plurality of trilateral inventory objects described by the set of trilateral inventory object attributes that change on a real-time basis by:

reordering, using the processor, the ordered list of trilateral inventory objects based on the updated relevance scores to produce a reordered list of trilateral inventory objects;

selecting, using the processor, a top N ranked number of trilateral inventory objects from the reordered list of trilateral inventory objects to render more relevant trilateral inventory objects, as compared to the ordered list of trilateral inventory objects, for the consumer identifier via an electronic interface of the consumer device;

configuring the top N ranked number of trilateral inventory objects for real-time rendering via the electronic interface of the consumer device;

providing, via the second network connection, the top N ranked number of trilateral inventory objects to the relevance service API; and transmitting, via the relevance service API and using a third network connection, real-time data associated with the top N ranked number of trilateral inventory objects to the consumer device to facilitate the real-time rendering of the top N ranked number of trilateral inventory objects via the electronic interface of the consumer device, wherein the top N ranked number of trilateral inventory objects are accessible via the electronic interface of the consumer device; and in response to receiving, via the relevance service API and using the third network connection, a user acceptance indication provided via user input to the electronic interface within a given time period that begins at the real-time rendering of the top N ranked number of trilateral inventory objects via the electronic interface, initiating, using the processor, redemption of a good, service or experience associated with at least one trilateral inventory object from the top N ranked number of trilateral inventory objects.

10. The computer-implemented method of claim 9, wherein the pre-determined set of subranges is configurable.

11. The computer-implemented method of claim 9, wherein calculating an updated relevance score is performed offline, and wherein the computer-implemented method further comprises:
- for each trilateral inventory object category, generating, using the processor, a table comprising a plurality of table entries, wherein each table entry of the plurality of table entries comprises a key value pair in which a key represents the subrange and a value represents the boost scaling factor.

12. The computer-implemented method of claim 11, further comprising:
- for each table, calculating, using the processor, z-scores using the boost scaling factor; and
- determining, using the processor, whether to consolidate a first table and a second table into a third table using the z-scores calculated for the first table and the second table.

13. The computer-implemented method of claim 9, wherein calculating the average category conversion rate using the respective conversion rates associated with each of the trilateral inventory objects associated with the trilateral inventory object category comprises:
- for each trilateral inventory object, calculating, using the processor, an average star rating using a total of votes for each of the set of star ratings;
- sorting, using the processor, the trilateral inventory objects based on their respective average star ratings; and
- calculating, using the processor, an external rating score for each trilateral inventory object using a cumulative distribution function applied to the sorted group of trilateral inventory objects.

* * * * *

UNITED STATES PATENT AND TRADEMARK OFFICE
CERTIFICATE OF CORRECTION

| | |
|---|---|
| PATENT NO. | : 11,449,906 B1 |
| APPLICATION NO. | : 15/281656 |
| DATED | : September 20, 2022 |
| INVENTOR(S) | : Guokai Zeng et al. |

It is certified that error appears in the above-identified patent and that said Letters Patent is hereby corrected as shown below:

In the Claims

In Column 22, Line 8, Claim 13, delete "the set of star" and insert -- the star --, therefor.

Signed and Sealed this
Twenty-first Day of March, 2023

Katherine Kelly Vidal
*Director of the United States Patent and Trademark Office*